(12) United States Patent
Zhang

(10) Patent No.: US 10,244,151 B2
(45) Date of Patent: Mar. 26, 2019

(54) SPORTS CAMERA WITH EXTERNAL ANTENNA

(71) Applicant: Chengdu CK Technology CO., LTD., Chengdu (CN)

(72) Inventor: Shou-chuang Zhang, Chengdu (CN)

(73) Assignee: CHENGDU SIOEYE TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 15/157,028

(22) Filed: May 17, 2016

(65) Prior Publication Data

US 2016/0373621 A1 Dec. 22, 2016

(30) Foreign Application Priority Data

Jun. 16, 2015 (CN) .......................... 2015 1 03320650

(51) Int. Cl.
| | |
|---|---|
| *H01Q 1/22* | (2006.01) |
| *H01Q 9/42* | (2006.01) |
| *G03B 17/02* | (2006.01) |
| *H04N 5/225* | (2006.01) |

(52) U.S. Cl.
CPC ........... *H04N 5/2252* (2013.01); *G03B 17/02* (2013.01); *G03B 2217/002* (2013.01); *H01Q 1/22* (2013.01); *H01Q 9/42* (2013.01)

(58) Field of Classification Search
CPC ...... H04N 5/2252; H04B 1/3827; H01Q 1/12; H01Q 1/36; H01Q 1/48; H01Q 1/22; H01Q 9/42; G03B 2217/002; G03B 17/02

USPC .......................................................... 348/373
See application file for complete search history.

(56) References Cited

U.S. PATENT DOCUMENTS

| | | | | |
|---|---|---|---|---|
| 7,557,760 | B2 * | 7/2009 | Chang | H01Q 1/243 343/700 MS |
| 8,466,839 | B2 * | 6/2013 | Schlub | H01Q 1/243 343/702 |
| 8,798,674 | B2 * | 8/2014 | Kim | G06F 1/1656 343/870 |
| 8,952,860 | B2 * | 2/2015 | Li | H01Q 9/42 343/702 |
| 9,368,862 | B2 * | 6/2016 | Oh | H01Q 1/48 |
| 2005/0057404 | A1 * | 3/2005 | Demicco | H01Q 1/088 343/702 |
| 2007/0262909 | A1 * | 11/2007 | Chang | H01Q 1/243 343/702 |
| 2007/0286144 | A1 * | 12/2007 | Miyake | H04M 1/7253 370/338 |
| 2008/0039160 | A1 * | 2/2008 | Homer | H01Q 1/12 455/575.7 |

(Continued)

*Primary Examiner* — Pritham D Prabhakher
(74) *Attorney, Agent, or Firm* — Perkins Coie LLP

(57) ABSTRACT

The disclosed technology is directed to a sports camera capable of being connected with an external antenna. The sports camera includes a housing and a camera main body. The camera main body includes a processor, an image component, a communication component, and an antenna feed component. The housing includes an antenna connector (e.g., feed points) configured to connect with the external antenna (e.g., a pogo pin antenna). The antenna connector is coupled to the antenna feed component. The external antenna can enhance data transmission (e.g., live streaming of captured images) between the sports camera and other devices.

12 Claims, 6 Drawing Sheets

(56) References Cited

U.S. PATENT DOCUMENTS

| | | | | |
|---|---|---|---|---|
| 2008/0165078 A1* | 7/2008 | Song | ............ | H01Q 1/084 343/906 |
| 2009/0251372 A1* | 10/2009 | Degner | ............ | H01Q 1/084 343/702 |
| 2010/0012721 A1* | 1/2010 | Jain | ............ | G06K 7/10237 235/380 |
| 2010/0171830 A1* | 7/2010 | Lee | ............ | B60R 1/12 348/148 |
| 2011/0184249 A1* | 7/2011 | Davis, Jr. | ............ | A61B 5/0013 600/300 |
| 2011/0205380 A1* | 8/2011 | Shirakawa | ............ | H04N 5/232 348/211.9 |
| 2011/0281617 A1* | 11/2011 | Kim | ............ | G06F 1/1656 455/556.1 |
| 2013/0207856 A1* | 8/2013 | Oon | ............ | H01Q 9/06 343/729 |
| 2013/0321217 A1* | 12/2013 | Lee | ............ | H01O 21/0006 343/702 |
| 2014/0099905 A1* | 4/2014 | Jimenez | ............ | H04M 1/0256 455/90.2 |

\* cited by examiner

SPORTS CAMERA WITH EXTERNAL ANTENNA

CROSS-REFERENCE TO RELATED APPLICATIONS

This application claims the benefit of Chinese Patent Application No. 2015103320650, filed Jun. 16, 2015 and entitled "A SPORTS CAMERA WITH AN EXTERNAL ANTENNA," the contents of which are hereby incorporated by reference in its entirety.

BACKGROUND

Traditionally, if news media desires to obtain certain images on a sporting event, a camera crew and a satellite news gathering (SNG) vehicle are required to complete this task. The SNG vehicle is usually expensive and relatively difficult to maintain. In recent years, due to the ubiquity of sports cameras, it becomes possible that news media can rely on a sports camera located at a scene (which can be operated by a professional or an amateur) as its image source. News media usually requires its image source to be able to provide real-time images. Widely-used sports cameras, however, do not have such capacity. Therefore, it is beneficial to have a sports camera that can capture images or live video at a scene and then transmit them on a real-time basis.

BRIEF DESCRIPTION OF THE DRAWINGS

Embodiments of the disclosed technology will be described and explained through the use of the accompanying drawings.

Figure 1:
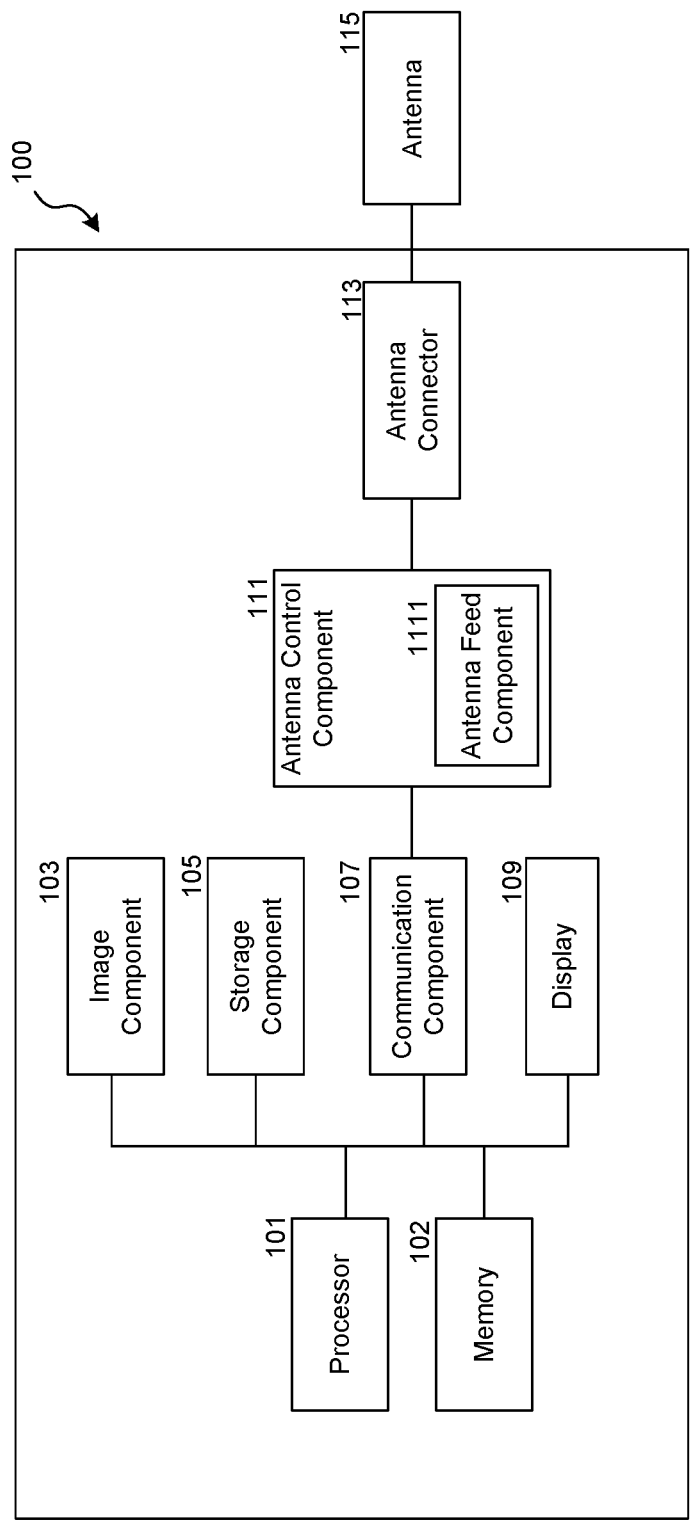
FIG. 1 is a schematic block diagram illustrating a system in accordance with embodiments of the disclosed technology. The system is coupled to an outside antenna.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiment", "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure provides a sports camera system that is capable of connecting with an outside antenna so as to transmit real-time captured images or video to a remote device (e.g., a mobile device or a server) via a network (e.g., a 4G network). The outside antenna can be selected based on various antenna factors, such as transmitting range, signal strength, receiver coverage, etc. The sports camera of the present disclosure enables a user to provide seamless live streaming video even in areas having poor signal coverage.

The sports camera system of the present disclosure includes an antenna control component for effectively managing and controlling antennas associated with the sports camera. For example, the sports camera system can test current signal strength for each of the available antennas and accordingly make recommendations to a user regarding which antenna to use.

The sports camera system of the present disclosure provides a camera housing with at least one antenna connector integrated thereon. This arrangement enables a user to easily couple the sports camera to an outside antenna or to conveniently dis-engage a currently-installed antenna in all types of ambient environments (e.g., environments with rain, snow, heavy dust, etc.), without interference with the sports camera's normal operation. For example, the present disclosure enables a user to switch antennas without opening a water-proof housing of the sports camera system, which avoids the risks of exposing interior components of a sports camera to potential outside threats (e.g., moisture, dust, or contaminants in ambient environments).

Advantages of the present disclosure include, for example, that (1) it provides a sports camera system that can stream live videos via an outside antenna even in areas with poor signal coverage; (2) it enables a user to conveniently choose a proper antenna to use based on ambient environments; and (3) it enables a user to easily attach/detach an antenna to/from a sports camera.

FIG. 1 is a schematic block diagram illustrating a system 100 in accordance with embodiments of the disclosed technology. The system 100 includes a processor 101, a memory 102, an image component 103, a storage component 105, a communication component 107, a display 109, an antenna control component 111, and an antenna connector 113. The antenna control component 111 further includes an antenna feed component 1111. The system 100 is coupled to an antenna 115 via the antenna connector 113. In some embodiments, the antenna 115 can be a pogo pin antenna.

The processor 101 is configured to control the memory 102 and other components (e.g., components 103-113) in the system 100. The memory 102 is coupled to the processor 101 and configured to store instructions for controlling other components in the system 100. The image component 103 is configured to capture or collect images (pictures, videos, etc.) from ambient environments of the system 100. In some embodiments, the image component 103 can be a camera. In some embodiments, the image component 103 can be a video recorder.

The storage component 105 is configured to store, temporarily or permanently, information/data/files/signals associated with the system 100. In some embodiments, the storage component 105 can be a hard disk drive. In some embodiments, the storage component 105 can be a memory stick or a memory card. The display 109 can visually present the images captured by the image component 103.

The communication component 107 is configured to communicate with devices/components outside the system 100. In some embodiments, the communication component 107 can transmit images captured by the image component 103 to a remote device (e.g., a server or a mobile device) via a network (e.g., a wireless network). In some embodiments, the communication component 107 is configured to receive information that indicates signal strength/coverage of a communication network (e.g., a 4G network).

As shown in FIG. 1, the communication component 107 is coupled to the antenna control component 111, which includes the antenna feed component 1111. The antenna feed component 1111 acts as a signal interface between the antenna 115 and the system 100. For example, the antenna feed component 1111 can receive radio waves from the antenna 115 and converts then into a form (e.g., electrical current) that is recognizable by the system 100. Similarly, the antenna feed component 1111 can convert signals/information to be transmitted via the antenna 115 to radio waves such that the antenna 115 can transmit the signals/information outwardly.

In some embodiments, the antenna control component 111 can be configured to manage the communication between the antenna 115 and the system 100. For example, the antenna control component 111 can detect (e.g., in response to an event that a user attaches the antenna 115 to the system 100) the type of the antenna 115 and then decide a proper way to interact with the antenna 115. As another example, the antenna control component 111 can detect whether the connection between the antenna 115 and the system 100 is normal. In some embodiments, the antenna control component 111 can check whether the antenna connector 113 is properly coupled to the antenna 115 and the antenna control component 111. In some embodiments, the antenna control component 111 can be an integrated chip with a set of instructions stored therein. In some embodiments, the antenna control component 111 can be a System-On-Chip (SoC) chip. In some embodiments, the antenna control component 111 can be implemented as a set of instructions, software/firmware, applications, etc. stored in the storage component 105 and that can be performed by the processor 101.

As shown in FIG. 1, the antenna connector 113 is positioned between the antenna 115 and the antenna control component 111. In some embodiments, the antenna connector 113 can be a structure at least partially embedded in a housing of the system 100. For example, the antenna connector 113 can include one or more antenna feed points positioned on an outer surface of the housing of the system 100. Positioning the antenna feed points on the outer surface of the housing enables a user to easily attach the antenna 115 to the system 100 through the antenna feed points. The shapes/sizes of the antenna feed points can vary depending on the types of the antenna 115. Embodiments of the feed points will be discussed in detail in FIGS. 4 and 5A-5D and corresponding descriptions below.

Figure 2:
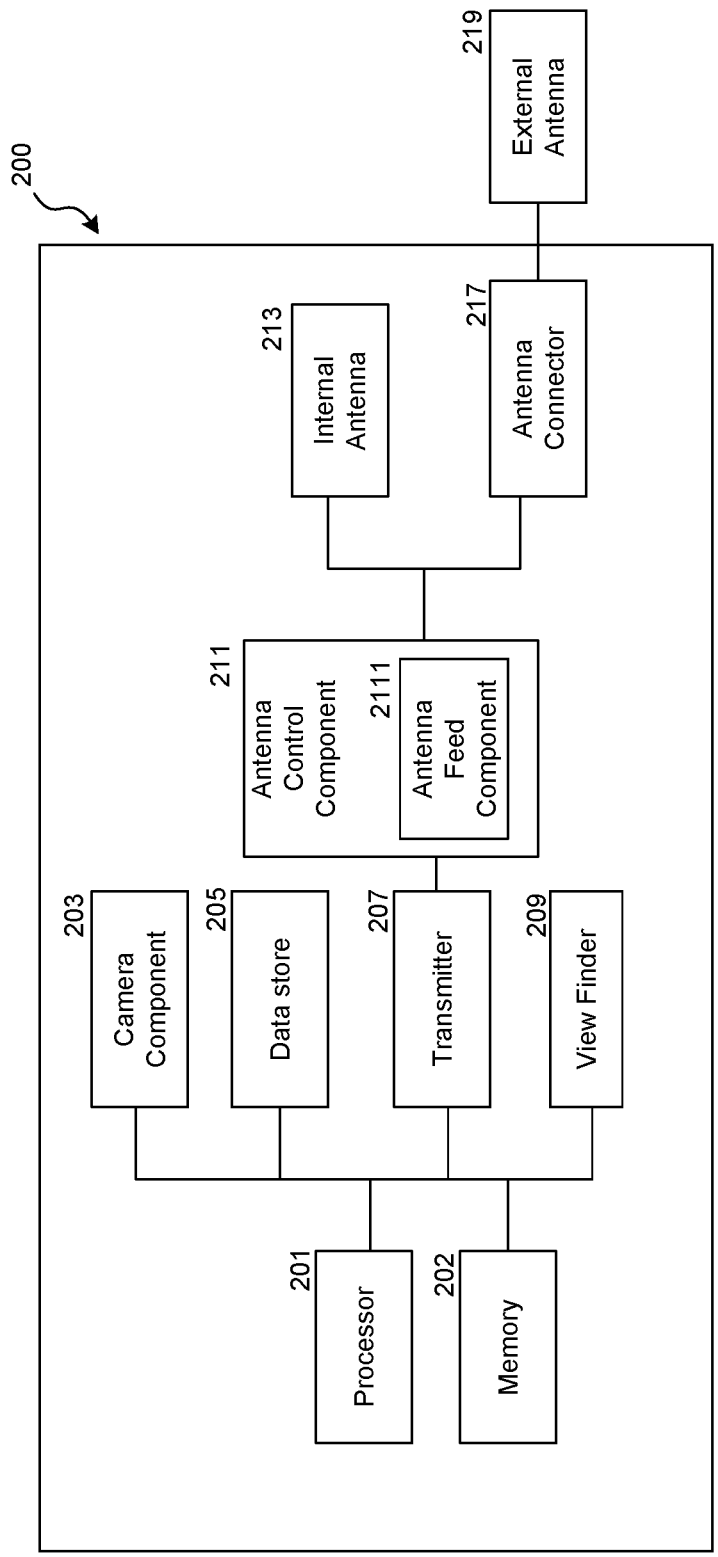
FIG. 2 is a schematic block diagram illustrating a system in accordance with embodiments of the disclosed technology. The system includes an internal antenna and is coupled to an external antenna.

FIG. 2 is a schematic block diagram illustrating a system 200 in accordance with embodiments of the disclosed technology. The system 200 includes an internal antenna 213 and can be coupled to an external antenna 219. The system 200 includes a universal antenna feed component 2111 for both the internal antenna 213 and the external antenna 217. As shown, the system 200 includes a processor 201, a memory 202, a camera component 203, a data store 205, a transmitter 207, a view finder 209, an antenna control component 211 having the antenna feed component 2111, and an antenna connector 217. The system 200 can choose to communicate with a remote device (e.g., a server, mobile device, etc.) via a network through the internal antenna 213 and/or the external antenna 219. Factors to consider when determining which antenna to use include, for example, signal strength, signal coverage, antenna capacities, antenna power consumptions, etc.

As shown, the antenna control component 211 is coupled to the external antenna 219 via the antenna connector 217. In some embodiments, the external antenna 219 can be a pogo pin antenna. In some embodiment, the internal antenna can be a patch antenna, a printed antenna, or a micro-strip antenna. The processor 201 and memory 202 have functions similar to those of the processor 101 and memory 102. The camera component 203 is configured to capture or collect images (pictures, videos, etc.) from ambient environments of the system 200. The data store 205 is configured to store, temporarily or permanently, information/data/files/signals associated with the system 200. The view finder 209 can visually present the images captured by the camera component 203.

The transmitter 207 is configured to communicate with devices or components outside the system 200. In some embodiments, the transmitter 207 can transmit images captured by the camera component 203 to a remote device (e.g., a server or a mobile device) via a network (e.g., a wireless network). In some embodiments, the transmitter 207 can receive information that indicates signal strength/coverage of a communication network (e.g., a 4G network). As shown in FIG. 2, the transmitter 207 is coupled to the antenna control component 211, which includes the antenna feed component 2111. The antenna feed component 2111 acts as a signal interface between the internal antenna 213/external antenna 219 and the system 200. For example, the antenna feed component 2111 can receive radio waves from the internal antenna 213/external antenna 219 and converts then into a form (e.g., electrical current) that is recognizable by the system 200. Similarly, the antenna feed component 2111 can convert signals/information to be transmitted via the internal antenna 213 or the external antenna 219 to radio waves such that the signals/information can be transmitted outwardly.

As shown in FIG. 2, the antenna connector 217 is positioned between the external antenna 219 and the antenna control component 211. In some embodiments, the antenna connector 217 can be a structure at least partially embedded in a housing of the system 200. Positioning the antenna feed points in the housing enables a user to easily attach the external antenna 219 to the system 200. Embodiments of the antenna connector 217 will be discussed in detail in FIGS. 4 and 5A-5D and corresponding descriptions below.

Figure 3:
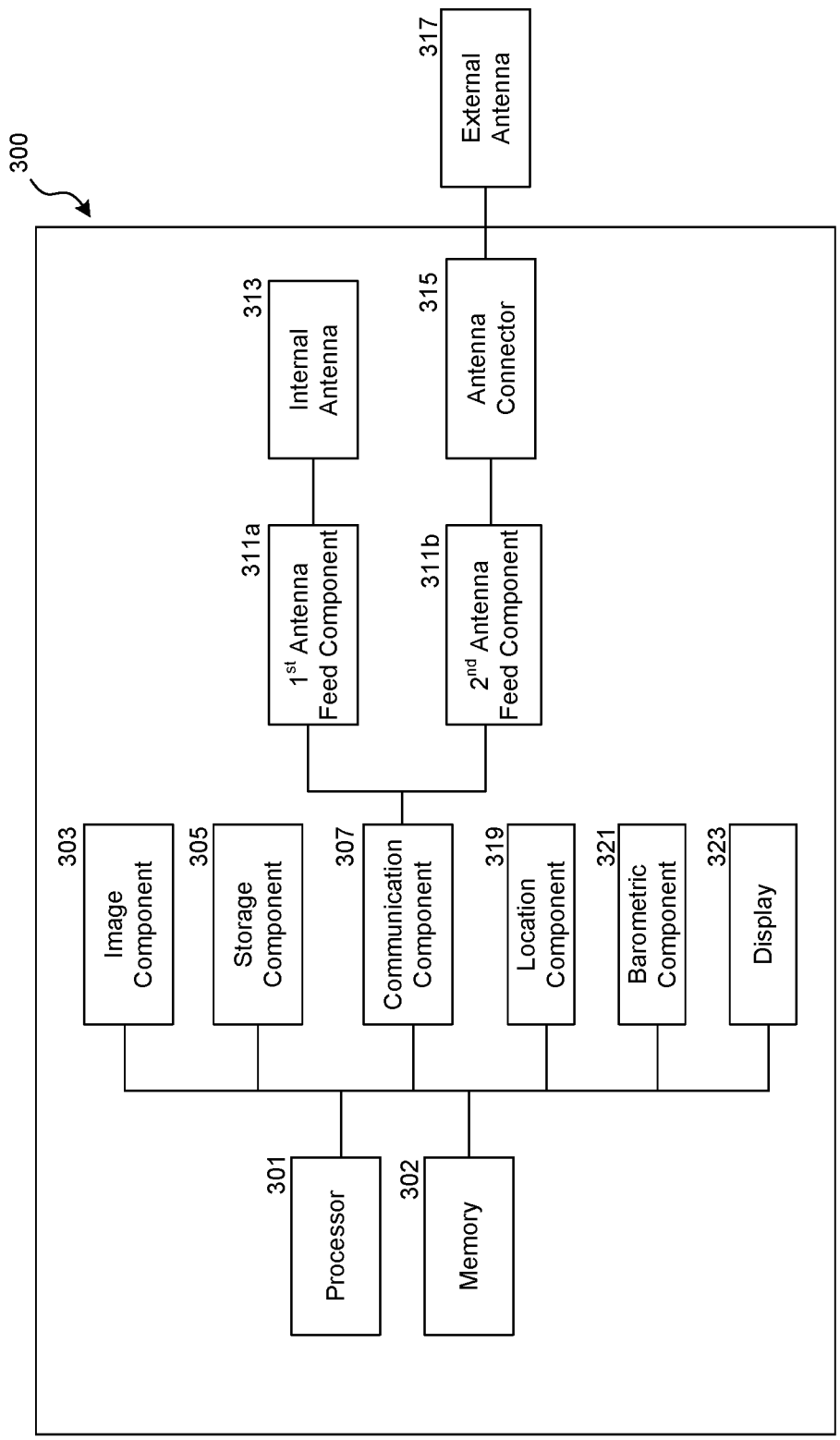
FIG. 3 is a schematic block diagram illustrating a system in accordance with embodiments of the disclosed technology. The system includes separate antenna feed components for the internal and external antennas.

FIG. 3 is a schematic block diagram illustrating a system 300 in accordance with embodiments of the disclosed technology. The system 300 includes an internal antenna 313 and can be coupled to an external antenna 317. The system 300 includes a first antenna feed component 311a coupled to the internal antenna 313 and a second antenna feed component 311b coupled to the external antenna 317 (through an antenna connector 315). As shown, the system 300 also includes a processor 301, a memory 302, an image component 303, a storage component 305, a communication component 307, a location component 319, a barometric component 321 and a display 323. The processor 301, the memory 302, the image component 303, the storage component 305, the communication component 307 and the display 323 can have functions similar to those of the corresponding components described in the embodiments associated with the systems 100 and 200.

As shown in FIG. 3, the communication component 307 is coupled to the first antenna feed component 311a and the second antenna feed component 311b. The first and second antenna feed components 311a and 311b can function as a signal interface between the internal/external antenna 313, 317 and the system 300. For example, the first antenna feed component 311a can receive radio waves from the internal antenna 313 and converts then into a form (e.g., electrical current) that is recognizable by the communication component 307. The second antenna feed component 311b can receive radio waves from the external antenna 317 and converts then into a form (e.g., electrical current) that is recognizable by the communication component 307. As another example, the first antenna feed component 311a can convert signals/information to be transmitted via the internal antenna 313 to radio waves such that the signals/information can be transmitted outwardly in a proper form. Similarly, the second antenna feed component 311b can convert signals/information to be transmitted via the external antenna 317 to radio waves such that the signals/information can be transmitted properly.

As shown in FIG. 3, the antenna connector 315 is positioned between the external antenna 317 and the second antenna feed component 311b. In some embodiments, the antenna connector 315 can be a structure at least partially embedded in a housing of the system 300. Embodiments of the antenna connector 315 will be discussed in detail in FIGS. 4 and 5A-5D and corresponding descriptions below.

Figure 4:
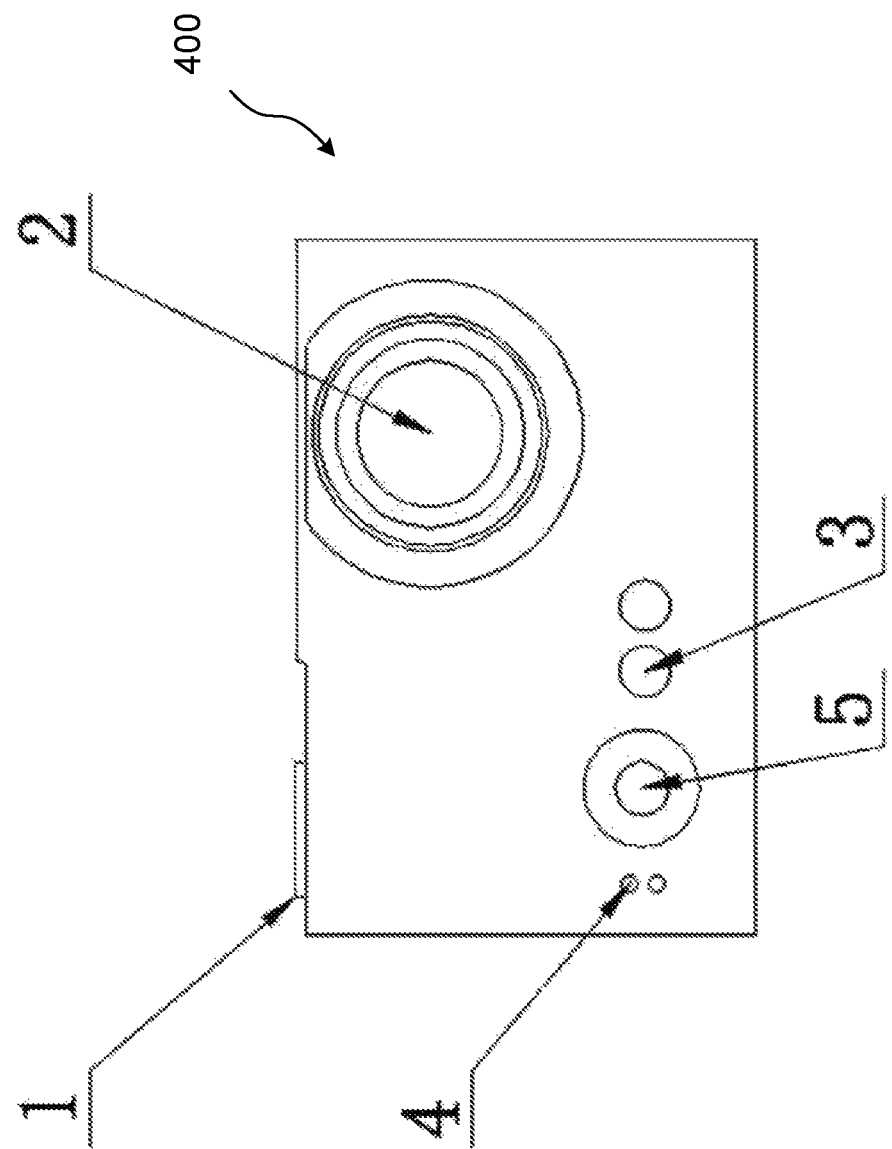
FIG. 4 is a side view of a camera housing illustrating an antenna feed point in accordance with embodiments of the disclosed technology.

FIG. 4 is a side view of a camera housing 400 illustrating an antenna feed point 4 positioned thereon in accordance with embodiments of the disclosed technology. As shown in FIG. 4, the camera housing 400 of a camera system includes a shutter button 1, a camera lens 2, one or more indicators 3, one or more feed points 4, and a power switch 5. The shutter button 1 is configured to initiate a process of collecting images by the camera lens 2. The indicator 3 is configured to show a status of the system (e.g., power is on or off). The power switch 5 is configured to turn on or off the system 400. The feed point 4 is configured to couple to an antenna (e.g., the antenna 115 or the external antennas 219, 317). In some embodiments, the feed point 4 can be a part of an antenna connector (e.g., the antenna connector 113, 217 or 315). In other embodiments, the feed point 4 can electrically couple to the antenna connector via wires, electrical connectors, or other suitable means. In the illustrated embodiment, the feed point 4 is positioned on the same side of the camera lens 2. In other embodiments, however, the feed point 4 can be positioned at other place of the camera housing 400 depending on various design needs. In various embodiments, the camera housing 400 can have more than one feed points 4 positioned thereon.

Figure 5A:
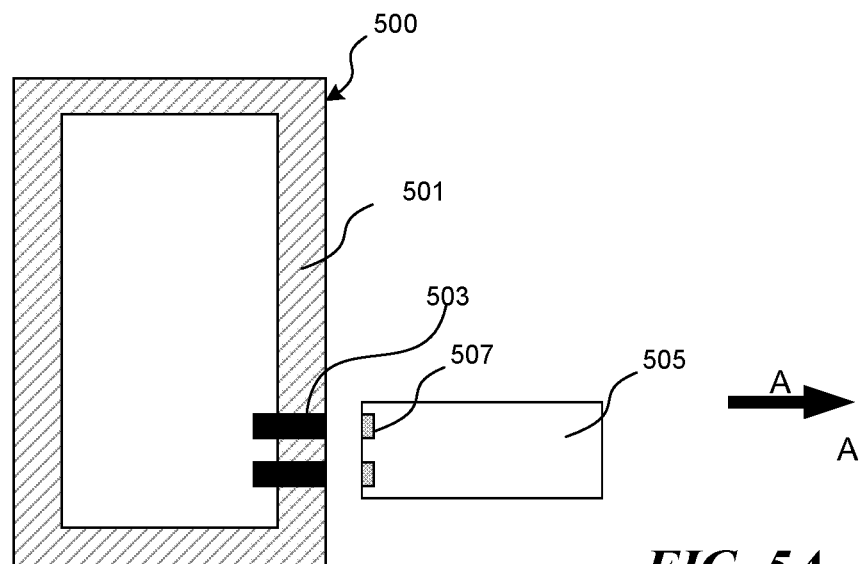
FIGS. 5A-5D are schematic diagrams illustrating antenna connectors in accordance with embodiments of the disclosed technology.
Figure 5B:
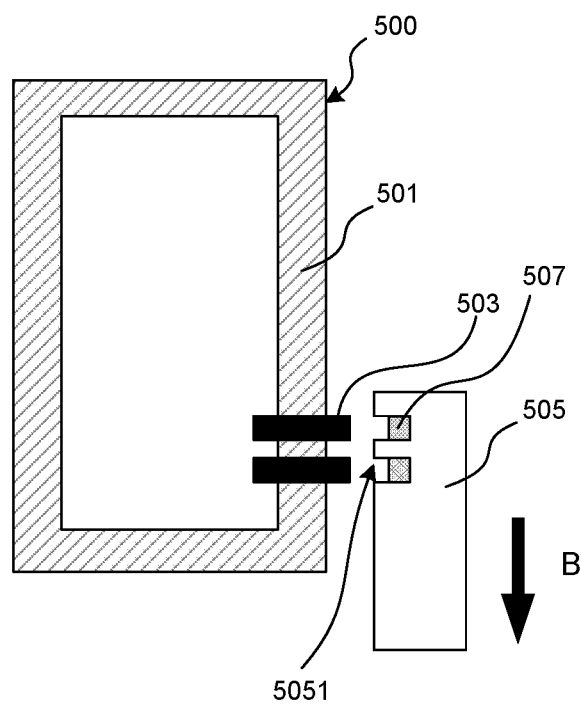
Figure 5C:
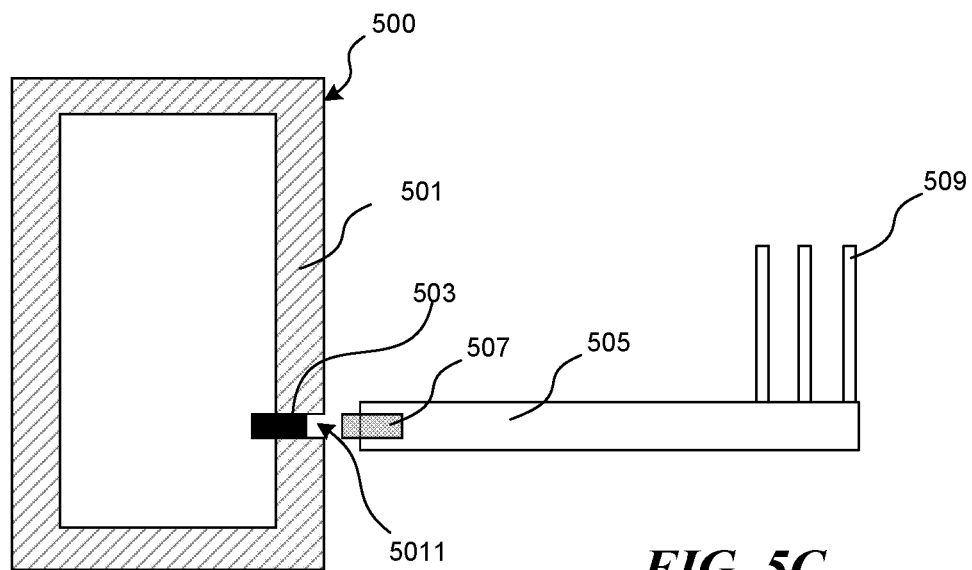

FIGS. 5A-5D are schematic diagrams illustrating antenna connectors 503 in accordance with embodiments of the disclosed technology. As shown In FIGS. 5A-5C, a camera system 500 can include a camera housing 501. The camera housing 501 can include one or more openings to accommodate one or more antenna connectors 503. The antenna connectors 503 passes through the corresponding openings and are configured to be electrically coupled to antennas 505. In the illustrated embodiments, the antenna 505 includes one or more contacting points 507 configured to be electrically connected with corresponding antenna connectors 503.

In FIG. 5A, the antenna connector 503 can be positioned flush with an outer surface of the camera housing 501. Accordingly, a contacting point 507 is positioned flush with an outer surface of the antenna 505. The antenna 505 and the antenna connector 503 can be fixedly attached by a mechanical mechanism (not shown) such as a latch or screw. In other embodiments, the antenna 505 and the antenna connector 503 can be fixedly attached by magnetic force. In the illustrated embodiments shown in FIG. 5A, the antenna 505 can be positioned in a direction vertical to the camera housing 501 (e.g., direction A). In such embodiments, the antenna 15 can function as a structure that provides additional gripping surfaces to a user such that the user can have a better grip on the camera system 500. In some embodiments, the antenna 505 can be positioned so as to have a better signal reception (e.g., by adjusting the mechanical mechanism to make the antenna pointing to a certain direction).

In FIG. 5B, the antenna connector 503 can be positioned such that a protrusion portion of the antenna connector 503 extends through the camera housing 501. Accordingly, a contacting point 507 is positioned in a recess 5051 formed in the antenna 505. In the illustrated embodiments shown in FIG. 5B, the protrusion portion of the antenna connector 503 can be inserted in the corresponding recess of the antenna 505 so as to electrically connect the antenna 505 and the antenna connector 503. In the illustrated embodiments shown in FIG. 5B, the antenna 505 can be positioned in a direction parallel to the camera system 500 (e.g., direction B) such that the antenna 505 does not substantially interfere with routine operations of the camera system 500.

In FIG. 5C, the antenna connector 503 can be positioned to partially pass through the camera housing 501 such that to form a recess 5011 in the camera housing 501. Accordingly, a contacting point 507 can be formed as a protrusion from the antenna 505. In the illustrated embodiments shown in FIG. 5C, the contacting point 507 can be inserted in the recess 5011 of the camera housing 501 so as to electrically connect the antenna 505 and the antenna connector 503. In the illustrated embodiments shown in FIG. 5C, the antenna 505 can include one or more foldable structures 509 that can enhance signal reception or provide more gripping surfaces to a user.

Figure 5D:
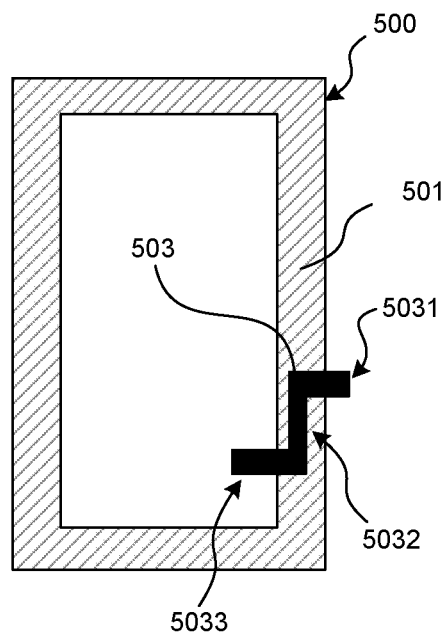

In the illustrated embodiments shown in FIG. 5D, the antenna connector 503 can include an outer portion 5031, a center portion 5032, and an inner portion 5033. The outer portion 5031 is configured to electrically couple to an antenna. The inner portion 5033 is configured to electrically couple to an antenna feed component or an antenna control component. The center portion 5032 is positioned inside the camera housing 501 and configured to connect with the outer portion 5031 and the inner portion 5033. This arrangement provides design flexibility of the camera system 500. For example, a designer of the camera system 500 can position the outer portion 5031 on anywhere of an outer surface of the camera housing 501, not limited by the physical location of the inner portion 5033 (e.g., the inner portion 5033 may need to be as close as possible to an antenna feed point inside the camera system 500).

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A camera system, comprising:
   a camera;
   a housing configured to accommodate the camera and having a first opening; and
   an antenna connector at least partially passing through the first opening, the antenna connector having a feed point, the antenna connector configured to operably couple to an antenna via the feed point;
   wherein the antenna connector comprises an outer portion, a center portion, and an inner portion, and wherein the inner portion extends, at a first location of the housing, in a first direction, and wherein the outer portion is configured to electrically couple to the antenna, and wherein the outer portion extends, at a second location of housing, in a direction opposite to the first direction, and wherein the first location is spaced apart from the second location, and wherein the center portion is embedded into the housing and extends in a second direction generally perpendicular to the first direction, and wherein the center portion is configured to connect with the outer portion and the inner portion.

2. The camera system of claim 1, wherein the outer portion of the antenna connector is positioned flush with an outer surface of the housing.

3. The camera system of claim 1, wherein the outer portion of the antenna connector includes a protrusion portion, and wherein the protrusion portion extends through an outer surface of the housing toward the antenna.

4. The camera system of claim 1, wherein the outer portion of the antenna connector and the housing together form a recess, and wherein the recess is configured to accommodate a protrusion of the antenna.

5. The camera system of claim 1, wherein the inner portion is configured to electrically couple to an antenna feed through a second opening on an inner surface of the housing.

6. The camera system of claim 1, wherein the antenna includes a pogo pin antenna.

7. The camera system of claim 1, wherein the antenna includes a foldable structure.

8. The camera system of claim 1, wherein the antenna includes a contacting point configured to electrically couple to the feed point.

9. The camera system of claim 1, further comprising a camera lens positioned on a side of the housing, wherein the feed point is positioned on the side of the housing and is flush with the housing.

10. A camera system, comprising:
    a camera;
    a housing configured to accommodate the camera and having a first opening;
    an antenna connector at least partially passing through the first opening, the antenna connector having a feed point, the antenna connector configured to operably coupled to an antenna via the feed point;
    a display configured to visually present the image signal collected by the camera; and
    wherein the antenna connector comprises an outer portion, a center portion, and an inner portion, and wherein the inner portion extends, at a first location of the housing, in a first direction, and wherein the outer portion is configured to electrically couple to the antenna, and wherein the outer portion extends, at a second location of housing, in a direction opposite to the first direction, and wherein the first location is spaced apart from the second location, and wherein the center portion is embedded into the housing and extends in a second direction generally perpendicular to the first direction, and wherein the center portion is configured to connect with the outer portion and the inner portion.

11. The camera system of claim 10, wherein the antenna includes a contacting point configured to electrically couple to the feed point.

12. The camera system of claim 10, further comprising a camera lens positioned on a side of the housing, wherein the feed point is positioned on the side of the housing and is flush with the housing.

* * * * *